Mar. 27, 1923.

F. SCHAEFFER

FELTING MACHINE

Filed Nov. 6, 1922

1,449,842

Francis Schaeffer
Inventor by
Stewart
Attorneys

Patented Mar. 27, 1923.

1,449,842

UNITED STATES PATENT OFFICE.

FRANCIS SCHAEFFER, OF MOHNTON, PENNSYLVANIA.

FELTING MACHINE.

Application filed November 6, 1922. Serial No. 599,231.

*To all whom it may concern:*

Be it known that I, FRANCIS SCHAEFFER, a citizen of the United States, residing at Mohnton, in the county of Berks and State of Pennsylvania, have invented certain new and useful Improvements in Felting Machines, of which the following is a specification.

My invention relates to machines adapted more particularly for felting hats, and in which fixedly mounted rolls are employed in connection with relatively adjustable cooperating rollers; and it consists in the improved mechanism hereinafter fully set forth in connection with the accompanying drawing illustrating a preferred embodiment thereof, and is clearly defined in the subjoined claims.

Figure 1:
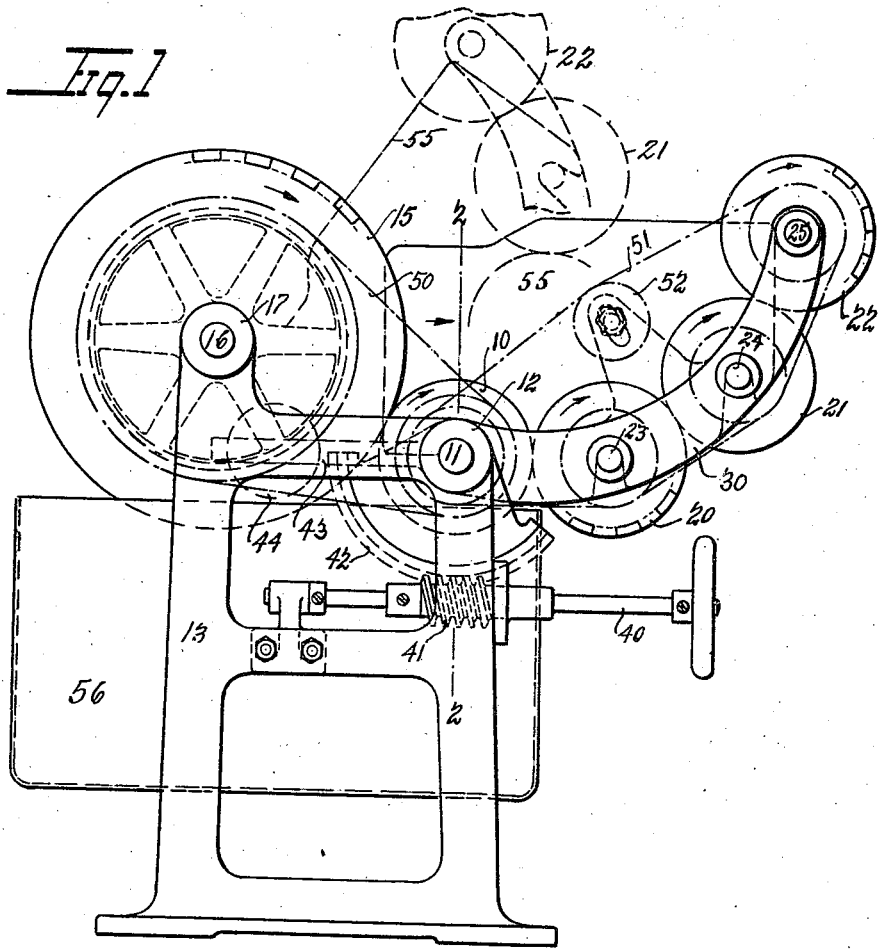
Fig. 1 is a side elevation of a machine embodying my invention; one of the material-retaining side walls being removed.
Figure 2:
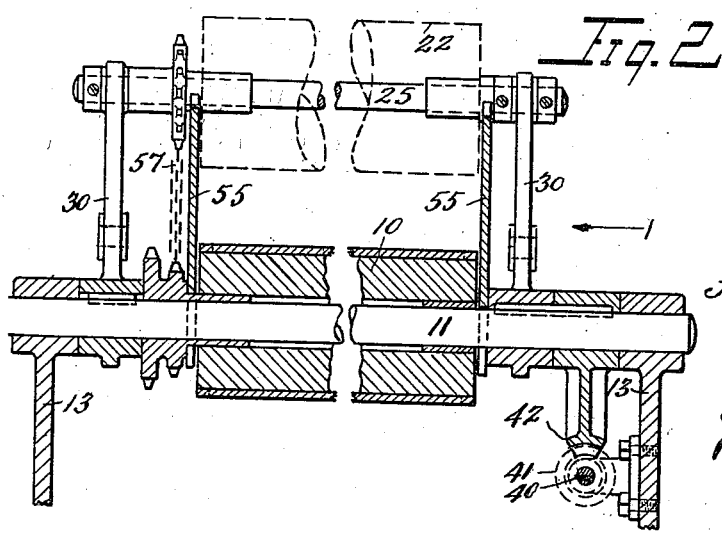
Fig. 2 is a cross-sectional view on the line 2—2 of Fig. 1 looking in the direction of the arrow.

In the specific construction illustrated as embodying my invention, the fixedly mounted bottom roller 10 of the series of felting rollers employed, is rotatably mounted upon a transverse shaft 11 extending between bearings 12 in spaced-apart vertical frame members 13; and the coacting fixedly mounted driving roller 15 is rotatable upon a parallel shaft 16 in frame bearings 17; the roller 15 being of larger diameter than the bottom roller 10, and its frame bearings 17 being located above the frame bearings 12 for the latter, so that said roller 15 will rise well above the coacting bottom roller 10 to serve as an abutment roller for the material operated upon as hereinafter described. The bottom roller 10 is belt-driven by the drive roller 15 as indicated; and the approximately tangential peripheries of these and the other similarly driven felting rollers hereinafter referred to, may be surfaced with spaced-apart lagging strips or otherwise as desired.

In connection with these felting rollers 10 and 15 forming fixedly mounted rotary portions of the material-supporting bed, I provide a series of coacting felting rolls 20, 21, 22 arranged to jointly form a rockable portion of the bed swinging upon the axis of the fixed bottom roller 10 so as to variably compress the material between the felting surfaces of the rollers; the axis of said rollers 20, 21, 22 as indicated being parallel transverse bars or shafts 23, 24, 25, the ends of which are supported in spaced-apart and upwardly turned bed-frame bars 30, 30, with the rollers 20, 21, 22 rotatably mounted thereon between the latter; and the rearward ends of said frame bars 30, 30 being pivotally mounted on the shaft 11 of the bottom roller 10 so as to permit of swinging said rollers 20, 21, 22 jointly around said bottom roller 12 and toward or away from the abutment roller 15.

This swinging movement of the rocking bed-frame 30, 30 and its rollers 20, 21, 22, is effected, as indicated, by operating a worm shaft 40 having a worm 41 arranged in engagement with a toothed quadrant 42 forming part of or fixed to said movable bed frame 30, 30; the latter having a rearwardly extending counterbalance projection 43 and weight 44 thereon as indicated.

All of the felting rollers are rotated in the same direction as indicated by arrows; so that the fixedly mounted bottom roller 10 and the coacting jointly swingable rollers 20, 21, 22 will exert an outward and upward action upon material resting thereon, while the abutment roller 15 against which the material is adjustably pressed as determined by the upward swinging of the rollers 20, 21, 22 will exert a downward action thereon, thus producing an approximately rotary travel of the treated material in the direction of the arrows. As shown, the suitably driven abutment roller 15 is arranged to drive the fixedly mounted bottom roller 10 by means of an endless chain or belt 50; and the latter roller similarly drives the movably carried rollers 20, 21, 22 by means of a belt 51, which latter is kept properly taut by means of an adjustable idler pulley 52.

To properly retain the material under treatment upon the rocker bed formed by the felting rollers 15, 10, 20, 21, 22, I employ side-wall plates 55, 55 at the ends of the rollers, resting upon the roller shafts 11, 23, 24, as indicated, and preferably adapted to be readily removed when desired. The tank for heated liquid as commonly employed and indicated at 56, is preferably arranged so that the fixedly mounted rollers 15 and 10 will dip into the contained liquid as may be desired, the main portion of the larger roller 15 however extending above the roller 10 so as to form a rotary abutment wall for the material pressed against it by the rocking material bed as described.

What I claim is:

1. In a felting machine, the combination with a fixedly mounted abutment roller of relatively large diameter; of a series of coacting felting rollers forming a material-carrying bed and comprising a bottom roller fixedly mounted adjacent said abutment roller and a plurality of additional material-carrying rollers jointly swingable about the axis of said bottom roller into varying relation to said abutment roller.

2. In a felting machine, the combination with a fixedly mounted abutment roller of relatively large diameter; of a series of coacting felting rollers forming a material-carrying bed and comprising a bottom roller fixedly mounted adjacent said abutment roller and a plurality of additional material-carrying rollers jointly swingable about the axis of said bottom roller into varying relation to said abutment roller; said jointly swingable bed rollers having their axes arranged in a curved line which is approximately concentric with said abutment roller when said bed rollers are swung into close relation to the latter.

3. In a felting machine, the combination with a fixedly mounted abutment roller of relatively large diameter; of a series of coacting felting rollers forming a material-carrying bed and comprising a bottom roller fixedly mounted adjacent said abutment roller and a plurality of additional material-carrying rollers jointly swingable about the axis of said bottom roller into varying relation to said abutment roller; said bed rollers being jointly rotated so as to carry the material thereon upwardly against the downward movement of the opposed abutment roller.

4. In a felting machine, the combination with a fixedly mounted abutment roller of relatively large diameter; of a series of coacting felting rollers forming a material-carrying bed and comprising a bottom roller fixedly mounted adjacent said abutment roller and a plurality of additional material-carrying rollers jointly swingable about the axis of said bottom roller into varying relation to said abutment roller; said jointly swingable bed rollers having their axes arranged in a curved line which is approximately concentric with said abutment roller when said bed rollers are swung into close relation to the latter, and said bed rollers being jointly rotated so as to carry the material thereon upwardly against the downward movement of the opposed abutment roller.

5. A felting machine comprising a frame, a liquid tank, two felting rollers of different diameters fixedly mounted on said frame so as to dip into said tank, a rocking roller-bed swingable upwardly upon the axis of the smaller of said fixedly mounted rollers into close relation to said larger fixedly mounted roller, means for determinedly swinging said roller bed, and means for jointly driving the cooperating rollers so as to impart an upward movement to the bed-supported material and a downward-acting movement to the opposed surface of said larger fixedly mounted roller.

6. In a felting machine comprising a series of jointly driven felting rollers two of which are fixedly mounted; a roller-carrying frame swingable upon the axis of one of said fixedly mounted rollers to bring the coacting rollers carried thereby into varying relation to the other of said fixedly mounted rollers, said swinging frame also carrying parallel wall plates arranged adjacent the opposite ends of the rollers mounted therein.

In testimony whereof I affix my signature.

FRANCIS SCHAEFFER.